(12) United States Patent
Meingast et al.

(10) Patent No.: US 7,448,206 B2
(45) Date of Patent: Nov. 11, 2008

(54) METHOD AND APPARATUS FOR POSTTREATMENT OF AN EXHAUST GAS FROM AN INTERNAL COMBUSTION ENGINE

(75) Inventors: Ulrich Meingast, Stuttgart (DE); Johannes Dehn, Suzhou (CN); Torsten Eggert, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 10/586,870

(22) PCT Filed: Nov. 19, 2004

(86) PCT No.: PCT/DE2004/002556

§ 371 (c)(1),
(2), (4) Date: Jul. 21, 2006

(87) PCT Pub. No.: WO2005/073524

PCT Pub. Date: Aug. 11, 2005

(65) Prior Publication Data

US 2007/0163241 A1    Jul. 19, 2007

(30) Foreign Application Priority Data

Jan. 30, 2004    (DE) .................. 10 2004 004 738

(51) Int. Cl.
*F01N 3/00* (2006.01)

(52) U.S. Cl. .................. 60/286; 60/295; 60/301; 60/303; 239/433; 239/494; 239/495; 239/509

(58) Field of Classification Search .................. 60/286, 60/295, 301, 303; 239/432, 433, 434, 434.5, 239/494, 495, 509, 585.3
See application file for complete search history.

(56) References Cited

U.S. PATENT DOCUMENTS

| | | | | |
|---|---|---|---|---|
| 4,955,183 | A * | 9/1990 | Kolodzie et al. | 60/303 |
| 5,038,562 | A * | 8/1991 | Goerlich | 60/274 |
| 6,449,947 | B1 * | 9/2002 | Liu et al. | 60/286 |
| 6,539,708 | B1 * | 4/2003 | Hofmann et al. | 60/286 |
| 6,601,385 | B2 * | 8/2003 | Verdegan et al. | 60/286 |
| 7,021,047 | B2 * | 4/2006 | Hilden et al. | 60/286 |
| 7,065,958 | B2 * | 6/2006 | Funk et al. | 60/286 |
| 2002/0162322 | A1 | 11/2002 | Ganzmann et al. | |
| 2004/0237511 | A1 | 12/2004 | Ripper et al. | |

FOREIGN PATENT DOCUMENTS

| | | |
|---|---|---|
| DE | 199 34 413 A1 | 1/2001 |
| DE | 101 31 803 A1 | 5/2003 |
| EP | 0 555 746 A1 | 8/1993 |
| FR | 2 384 206 | 10/1978 |

\* cited by examiner

*Primary Examiner*—Binh Q Tran
(74) *Attorney, Agent, or Firm*—Ronald E. Greigg

(57) ABSTRACT

A method of and an apparatus for posttreatment of an exhaust gas from an internal combustion engine, in which a substance to be mixed with the exhaust gas is sprayed in metered quantities into an exhaust gas line through which the exhaust gas flows. The substance is sprayed onto an impact plate disposed inside the exhaust gas line.

20 Claims, 2 Drawing Sheets

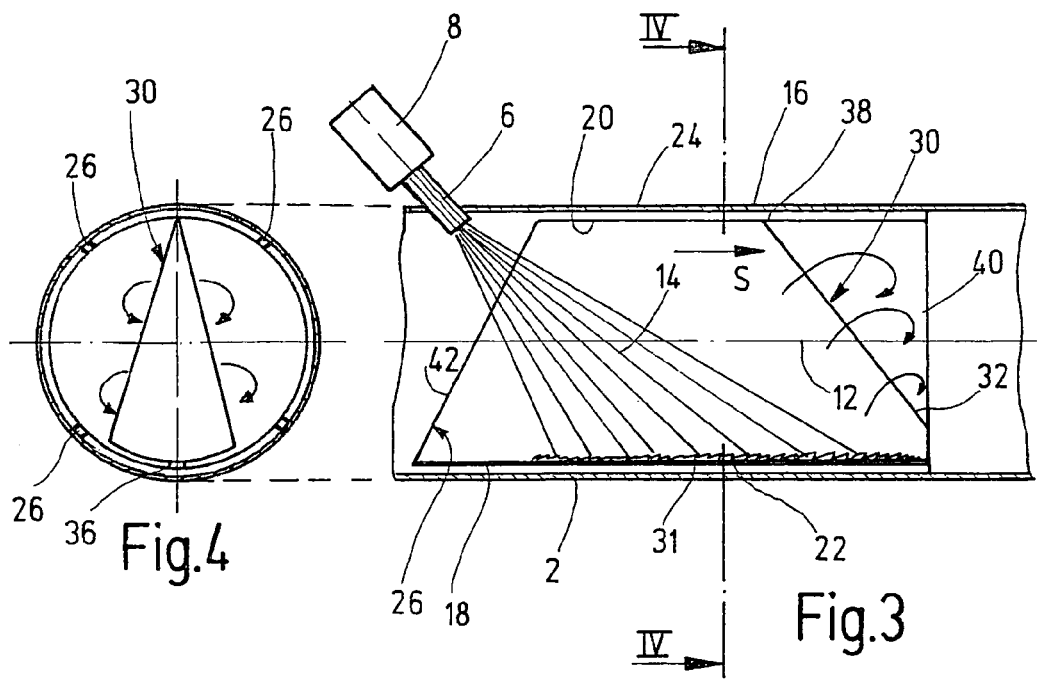
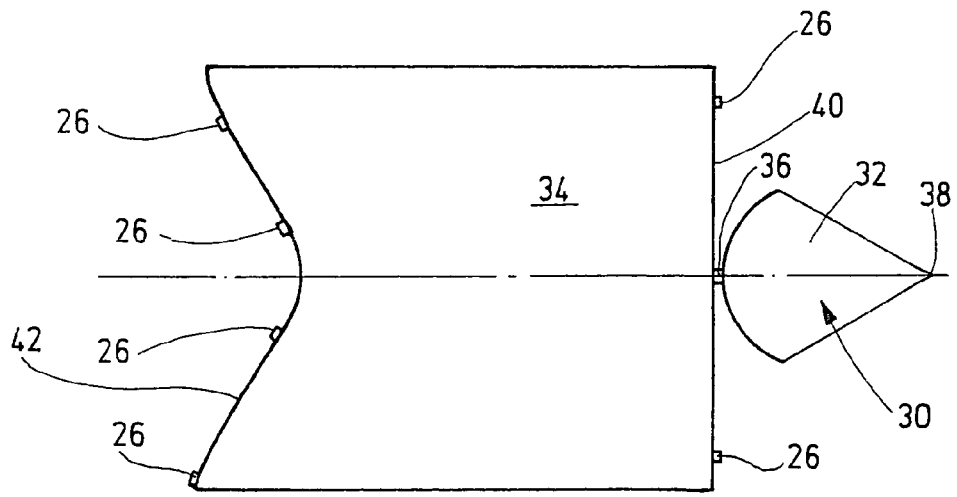

METHOD AND APPARATUS FOR POSTTREATMENT OF AN EXHAUST GAS FROM AN INTERNAL COMBUSTION ENGINE

CROSS-REFERENCE TO RELATED APPLICATIONS

This application is a 35 USC 371 application of PCT/DE 2004/002556 filed on Nov. 19, 2004.

BACKGROUND OF THE INVENTION

1. Field of the Invention

The invention relates to an improved method of and apparatus for posttreatment of an exhaust gas from an internal combustion engine.

2. Prior Art

Apparatuses, with which a substance to be mixed with the exhaust gas from an internal combustion engine is sprayed in metered quantities into an exhaust gas line through which exhaust gas flows are known for two different purposes.

First, a urea-water solution (UWS) is sprayed into the exhaust gas from diesel engines, to reduce the proportion of nitrogen oxides $NO_x$ in the exhaust gas. The urea in the sprayed-in solution is converted here in the exhaust gas line itself, or in a hydrolysis catalytic converter optionally located in the exhaust gas line, into ammonia $NH_3$, which in a downstream SCR catalytic converter reduces the nitrogen oxides $NO_x$, forming nitrogen $N_2$ and water $H_2O$. The delivery of the urea-water solution is done either with air reinforcement, through a metering pipe protruding into the exhaust gas flow, or by means of a cooled injection valve. In both cases, particularly at low exhaust gas speeds, it cannot be avoided that some of the urea-water solution will meet the wall of the exhaust gas line, which particularly at low exhaust gas or wall temperatures leads to the development of deposits of urea or urea reaction products. In these deposits, urea or urea reaction products are stored, and at a later point they can be undesirably released again, and particularly in a transient mode of operation of the engine, they can be a hindrance to an unproblematic, optimized denitrification process. Moreover, the deposits can increase the flow resistance of the exhaust gas line and thus impair the exhaust gas flow.

Second, for heating exhaust gas from internal combustion engines downstream of the engine, fuel is injected into the exhaust gas, in order to attain the exhaust gas temperatures required for regenerating a downstream $NO_x$ catalytic converter or diesel particle filter (DPF). The fuel here is usually sprayed purposefully onto a portion of the wall of the exhaust gas line, in order to vaporize the fuel faster, because of the contact with the heated wall of the line, than would take place solely by delivery into the hot exhaust gas. However, since the exhaust gas line is more or less severely cooled, among other factors by the relative wind of the motor vehicle, it cannot always be assured that the wall temperature of the exhaust gas line will be above the boiling temperatures of the higher-molecular ingredients of the commercial fuels used.

SUMMARY AND ADVANTAGES OF THE INVENTION

The method and apparatus of the invention, offer the advantage over the prior art that the temperature of an impact plate, mounted inside the exhaust gas line, is generally higher, because of lower heat losses, than that of an adjacent wall of the exhaust gas line. This also brings about faster heating up of the substance sprayed into the exhaust gas flow as it strikes the impact plate, located in the spraying direction of the spray device, or on striking its impact face diametrically opposite the spray device.

When the method and the apparatus are used for injecting a liquid or solid reducing agent into the exhaust gas flow, it has been found that this accelerating heating up of the reducing agent and, in the case of an SCR process, the resultant faster conversion of the urea into its subsequent products, leads to a reduction in deposits in the exhaust gas line, and as a result an unwanted storage of reducing agent in such deposits is avoided, and in exhaust gas tests, in which especially in the USA and Japan many operating points are in the range of relatively low exhaust gas temperatures of <250° C., an improvement in the dynamics and conversion rates can be attained.

When the method and the apparatus are used for post-engine combustion by fuel injection into the exhaust gas, the accelerated heating up of the fuel causes faster evaporation and thus an acceleration of the exothermal oxidation of the fuel, as a result of which the exhaust gas is heated for regenerating the catalytic converter or for burning off the Diesel particle filter. For further speeding up the evaporation, it may be advantageous to apply a thin coating of a porous ceramic material, metal wool, or some other suitable material onto the impact plate, so that the surface area of the impact face can be increased.

In general terms, by means of the impact plate of the invention, the speed of conversion of material, or of a change in the aggregate state of the substance delivered into the exhaust gas flow, can be increased, which is often advantageous in the ensuing exhaust gas treatment.

In a preferred feature of the invention, it is provided that the impact plate has a low thermal capacity, so that because of its low thermal inertia, it heats up very quickly to the temperature of the exhaust gas, and that for being secured in the exhaust gas line, the impact plate is joined to the wall of that line by connecting elements with poor thermal conductivity, so that at relatively high travel speeds associated with greater cooling of the wall, because of the relative wind, only little heat is dissipated from the impact plate to the wall.

To improve the mixing of the substance, evaporating from the impact plate, with the exhaust gas flowing past the impact plate, a further advantageous feature of the invention provides that the exhaust gas is made turbulent downstream of the impact plate in terms of the flow direction, preferably by a static mixer disposed downstream of the impact face in terms of the flow direction, which increases the turbulence of the exhaust gas flow downstream of the impact face and thus assures improved mixing of the exhaust gas flow there.

To provide for secure fastening and a defined position of the impact plate in the tail pipe and relative to the spraying direction, the impact plate is preferably bent in tubular form such that it can mounted at a slight spacing from the wall of the exhaust gas line, coaxially in the exhaust gas line, and has a beveled face end, through which the substance can be sprayed from a spray nozzle, oriented at an acute angle to the flow direction of the exhaust gas, of the spray device onto an impact face located on the inside of the impact plate and diametrically opposite from the spray nozzle.

To enable economical manufacture of the apparatus, the impact plate is preferably shaped together with the connecting elements serving to secure it in the exhaust gas line and together with the static mixer, if present, that serves to make the exhaust gas turbulent, in the form of a stamped and bent part made of thin sheet metal, which to prevent corrosion may for instance comprise stainless steel.

BRIEF DESCRIPTION OF THE DRAWINGS

The invention is described in further detail below in conjunction with the drawings, in which:

FIG. 3, a longitudinal sectional view through part of a motor vehicle tail pipe, with a modified apparatus according to the invention;

FIG. 4, a cross-sectional view taken along the line injection valve-IV in FIG. 3;

FIG. 5, a developed view of an impact plate of the apparatus of the invention shown in FIGS. 3 and 4.

DESCRIPTION OF THE PREFERRED EMBODIMENT

Figure 1:
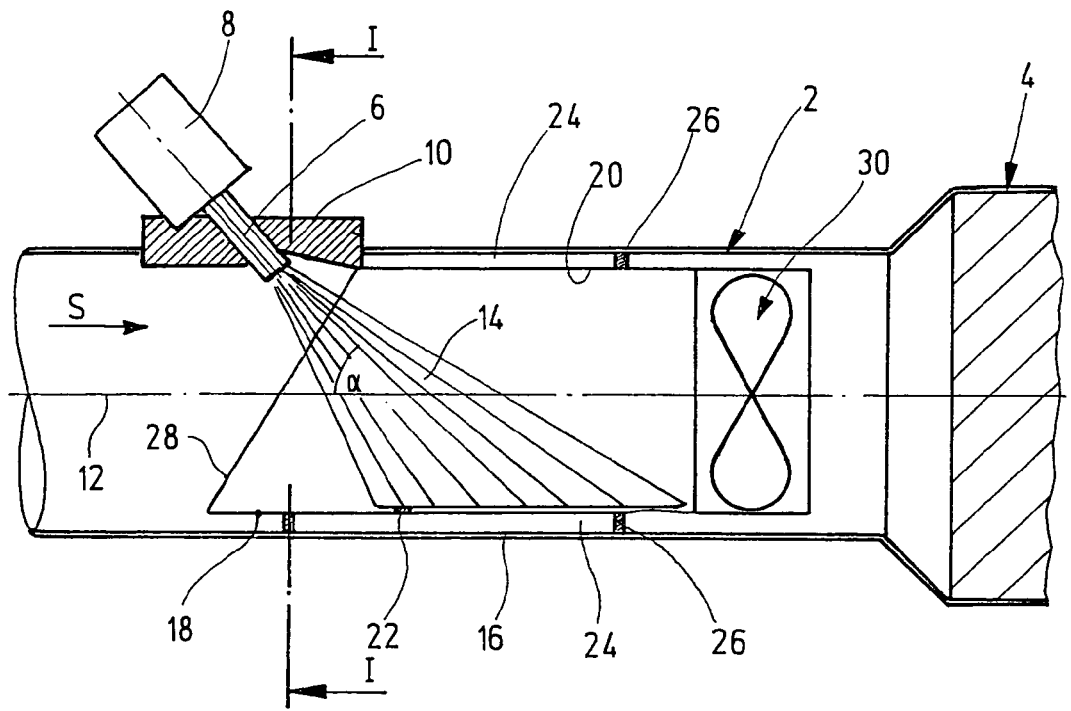
FIG. 1 is a longitudinal sectional view through part of a motor vehicle tail pipe with an apparatus according to the invention.
Figure 2:
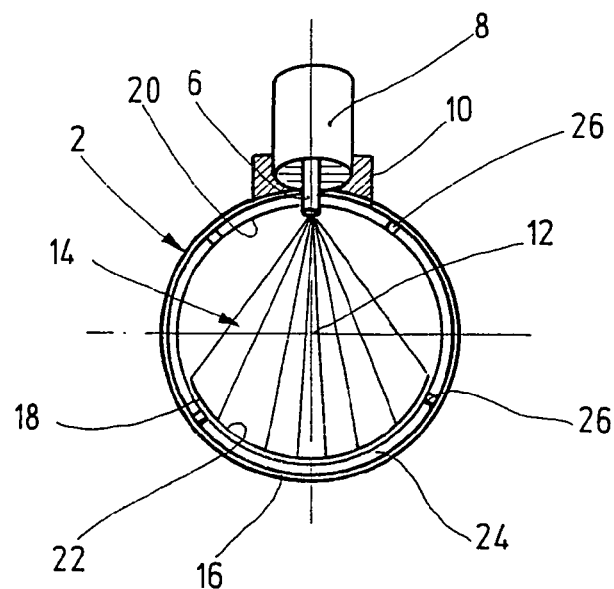
FIG. 2, a cross-sectional view taken along the line II-II in FIG. 1.

FIG. 1 shows a short portion of an exhaust manifold or tail pipe 2 of a motor vehicle with a diesel engine, between the engine (not shown) and a catalytic converter 4, which is also partly shown on the right-hand side of FIG. 1, and in which nitrogen oxides $NO_x$ contained in the tail pipe exhaust gas are reduced by reacting with ammonia $NH_3$, forming nitrogen $N_2$ and water $H_2O$.

For generating the ammonia that is needed for reducing the nitrogen oxides in the catalytic converter 4, a urea-water solution is sprayed, upstream in terms of the flow direction from a catalytic converter 4 in a manner known per se, through a spray nozzle 6 of a cooled injection valve or metering valve 8 into the exhaust gas flowing through the tail pipe 2. The spray nozzle 6 is retained by an adapter 10, which is inserted into the cylindrical wall of the tail pipe 2, and the nozzle is inclined to the longitudinal axis 12 of the tail pipe 2 so that a convergent spray stream or mist 14 emerging from the spray nozzle 6 enters the tail pipe 2 at an acute angle α to the flow direction (arrow S) of the exhaust gas.

To prevent the spray stream or mist 14 from striking a portion, diametrically opposite the spray nozzle 6, of the wall 16 of the tail pipe 2 that is cooled by the relative wind during travel of the motor vehicle, a thin impact plate 18 is mounted inside the tail pipe 2 directly downstream of the spray nozzle 6; with a part of its inside 20 pointing in the direction of the spray nozzle 6, it forms an impact face 22 for the droplets of the spray stream or mist 14 that reach as far as the impact plate 18.

The impact plate 18 comprises a metal sheet bent into a tube, which is inserted coaxially into the tail pipe 2 of circular cross section and which has a somewhat smaller diameter than the tail pipe 2, so that between the wall 16 of the tail pipe 2 and the outside of the impact plate 18, an annular gap 24, with a gap width of a few millimeters, remains open. For securing the impact plate 18, a plurality of spacer feet 26 of a material with poor thermal conductivity are used, spanning the annular gap 24, in order to minimize the heat dissipation from the impact plate 18, bathed by the hot exhaust gas, to the wall 16 of the tail pipe 2 that is cooled by the relative wind.

The face end 28 of the tubular impact plate 18 toward the front in terms of the flow direction, and adjacent to the spray nozzle 6, is beveled, and the longer wall portion having the impact face 22 is diametrically opposite the spray nozzle 6, so that the spray stream or mist 14 emerging from the spray nozzle 6 and passing through the beveled face end 28 of the tubular impact plate 18 strikes the impact face 22 and moistens it with the urea-water solution.

The thickness of the material comprising the impact plate 18 is relatively slight, or in other words less than the thickness of the wall 16 of the tail pipe 2, so that because of its low thermal capacity and the poor thermal conductivity of the spacer feet 26, it very quickly heats up to the temperature of the hot tail pipe gases, and unlike the externally cooled wall of the tail pipe 2, it also maintains that temperature. Thus the urea-water solution striking the impact face 22 also heats up quickly and evaporates from the impact face 22, so that even at low exhaust gas speeds and/or low exhaust gas temperatures downstream of the impact face 22, no deposits of urea or reaction products of the urea form in the tail pipe 2 or on the impact plate 18.

Because of the slight thickness of the material of the impact plate 18, incorporating the impact plate 18 does not substantially increase the flow resistance in the tail pipe 2.

To assure better mixing of the reducing agent, evaporated from the impact face 22, with the tail pipe exhaust gases, a static mixer 30, shown schematically as a guide vane in FIG. 1, can optionally be disposed downstream of the impact face 22 and assures intensive turbulence of the reducing agent together with the tail pipe exhaust gas.

FIGS. 3 through 5 show a similar impact plate 18, but it is used in post-engine heating of a tail pipe exhaust gas for the sake of regenerating an $NO_x$ storage catalytic converter or a Diesel particle filter (not shown); instead of the urea-water solution, a metered quantity of fuel is injected through the spray nozzle 6 into the tail pipe 2.

Here, the impact plate 18, on a part of its inside 20 facing toward the spray nozzle 6, is provided with a coating of metal wool 31, by which the surface area of this impact face 22, moistened by the spray stream or mist 14, is increased.

The static mixer 30 is also embodied here integrally with the impact plate 18 and comprises a part 32 of the metal sheet which protrudes, in the form of a sector 32, past the rear edge of a sheet-metal blank 34 of the impact plate 18 and is joined to the blank 34 by a thin bridge of material 36, as shown in FIG. 5, and which [part 32], after the bending of the blank 34 into a tube, is bent inward into the tube, as best seen from FIGS. 3 and 4. The part 32 of the sheet, bent over and fixed with its tip 38 on the inside 20 of the tubular impact plate 18, assures that the tail pipe exhaust gas as is made quite turbulent as it emerges from the impact plate 18 and thus assures good mixing of this exhaust gas with the fuel evaporated in it and on the hot impact face 22. The spacer feet 26 here are also formed by parts of the impact plate 18, which protrude in the form of narrow tongues past the two opposed end edges 40, 42 of the blank 34.

The foregoing relates to a preferred exemplary embodiment of the invention, it being understood that other variants and embodiments thereof are possible within the spirit and scope of the invention, the latter being defined by the appended claims.

The invention claimed is:

1. An apparatus for posttreatment of an exhaust gas of an internal combustion engine, comprising:

a device for metered spraying of a substance to be mixed with the exhaust gas;

an exhaust gas line through which the exhaust gas flows, the device spraying the substance to be mixed with the exhaust gas into the exhaust gas line;

an impact plate (18), disposed inside the exhaust gas line (2) in the spraying direction of the device (6,8), wherein the thickness of the material comprising the impact plate is less than a wall thickness of the exhaust gas line, such that the impact plate has a low thermal capacity in comparison to the exhaust gas line; and at least one connection element (26) disposed between the impact plate and the wall of the exhaust gas line; wherein the thermal conductivity of the connection element (26) is low in comparison to the thermal conductivity of the exhaust gas line.

2. The apparatus according to claim 1, wherein the impact plate (18) has an impact face (22), which is diametrically opposite a spray nozzle (6) of the device (6, 8).

3. The apparatus according to claim 2, wherein the impact plate (18), at least in the region of the impact face (22), is provided with a coating (31) that increases the area content of the surface.

4. The apparatus according to claim 2, further comprising a static mixer (30) disposed downstream of the impact face (22) in terms of the flow direction.

5. The apparatus according to claim 3, further comprising a static mixer (30) disposed downstream of the impact face (22) in terms of the flow direction.

6. The apparatus according to claim 4, wherein the mixer (30) is embodied integrally with the impact plate (18) that is produced as a stamped and bent part.

7. The apparatus according to claim 5, wherein the mixer (30) is embodied integrally with the impact plate (18) that is produced as a stamped and bent part.

8. The apparatus according to claim 1, wherein the impact plate (18) is tubular.

9. The apparatus according to claim 2, wherein the impact plate (18) is tubular.

10. The apparatus according to claim 3, wherein the impact plate (18) is tubular.

11. The apparatus according to claim 4, wherein the impact plate (18) is tubular.

12. The apparatus according to claim 5, wherein the impact plate (18) is tubular.

13. The apparatus according to claim 6, wherein the impact plate (18) is tubular.

14. The apparatus according to claim 7, wherein the impact plate (18) is tubular.

15. The apparatus according to claim 8, wherein a spray nozzle (6) of the device (6, 8) is oriented at an acute angle (a) to the flow direction (S) of the exhaust gas and sprays the substance through a beveled face end (28) of the impact plate (18) onto an impact face (22) diametrically opposite the spray nozzle (6).

16. The apparatus according to claim 9, wherein a spray nozzle (6) of the device (6, 8) is oriented at an acute angle (a) to the flow direction (S) of the exhaust gas and sprays the substance through a beveled face end (28) of the impact plate (18) onto the impact face (22) diametrically opposite the spray nozzle (6).

17. The apparatus according to claim 10, wherein a spray nozzle (6) of the device (6, 8) is oriented at an acute angle (a) to the flow direction (S) of the exhaust gas and sprays the substance through a beveled face end (28) of the impact plate (18) onto the impact face (22) diametrically opposite the spray nozzle (6).

18. The apparatus according to claim 11, wherein a spray nozzle (6) of the device (6, 8) is oriented at an acute angle (a) to the flow direction (S) of the exhaust gas and sprays the substance through a beveled face end (28) of the impact plate (18) onto the impact face (22) diametrically opposite the spray nozzle (6).

19. The apparatus according to claim 12, wherein a spray nozzle (6) of the device (6, 8) is oriented at an acute angle (a) to the flow direction (S) of the exhaust gas and sprays the substance through a beveled face end (28) of the impact plate (18) onto the impact face (22) diametrically opposite the spray nozzle (6).

20. The apparatus according to claim 13, wherein a spray nozzle (6) of the device (6, 8) is oriented at an acute angle (a) to the flow direction (S) of the exhaust gas and sprays the substance through a beveled face end (28) of the impact plate (18) onto the impact face (22) diametrically opposite the spray nozzle (6).

* * * * *